United States Patent [19]

Block

[11] Patent Number: 4,675,757

[45] Date of Patent: Jun. 23, 1987

[54] METHOD AND APPARATUS FOR SYNCHRONIZING TAPE RECORDING AND PLAYBACK MACHINES

[76] Inventor: Gerald Block, 45 Christopher St., New York, N.Y. 10014

[21] Appl. No.: 701,085

[22] Filed: Feb. 13, 1985

[51] Int. Cl.[4] .................. G11B 15/52; G11B 27/32
[52] U.S. Cl. .................................. 360/73; 360/14.3; 360/72.2
[58] Field of Search .................. 360/13, 14.1, 14.2, 360/14.3, 15, 71, 72.1, 72.2, 73, 74.1, 74.4

[56] References Cited

U.S. PATENT DOCUMENTS

| | | | |
|---|---|---|---|
| 2,702,315 | 2/1955 | Roderick | 179/100.1 |
| 3,274,574 | 9/1966 | Miller et al. | 340/174.1 |
| 3,736,565 | 5/1973 | Sidline | 340/172.4 |
| 3,911,488 | 10/1975 | Wood et al. | 360/71 |
| 4,210,939 | 7/1980 | Ninomiya et al. | 360/14 |
| 4,214,278 | 7/1980 | Hunt et al. | 360/14 |
| 4,232,347 | 11/1980 | Tachi | 360/73 |
| 4,267,564 | 5/1981 | Flores | 360/72.3 |
| 4,316,224 | 2/1982 | Hansen et al. | 360/72.2 |
| 4,322,747 | 3/1982 | Dischert et al. | 358/127 |
| 4,335,401 | 6/1982 | Zorbalas | 358/127 |
| 4,360,843 | 11/1982 | Menezes et al. | 360/14.3 |
| 4,450,490 | 5/1984 | Fujii et al. | 360/13 |

OTHER PUBLICATIONS

International Broadcast Engineer (GB), vol. 10, No. 168, Nov. 1979, pp. 18–20, VT editing—Modern Editing System Design, Regnier et al.
SMPTE Journal, vol. 88, No. 7, Jul. 1979, pp. 480–483, Distributive Processing Techniques in Post Production Editing, Eichstadt et al.
Studer TLS4000 Synchronizer brochure.

Primary Examiner—George G. Stellar
Attorney, Agent, or Firm—Kenyon & Kenyon

[57] ABSTRACT

A method and apparatus for synchronizing a plurality of tape recording and playback machines is described. A synchronizing device for each tape machine to be synchronized is provided. The synchronizing devices are coupled to each other via a communications channel including a serial port for transmitting control information and an additional conductor for transmitting master timing reference pulses. A synchronizing device is chosen as a master device. The master device transmits master timing reference pulses via the communications channel to the remaining tape machines, the pulses indicating the start of each frame on the master tape. Each of the remaining tape machines is a slave to the master. Frame numbers for selected frames on the master tape are transmitted on the serial port to the slave tape machines, but only on an infrequent basis, i.e., a frame number is not transmitted for each frame. A local counter in each of the slave synchronizing devices counts the master timing reference pulses to keep track of the master frame numbers between transmitted frame numbers. An apparatus and method also are disclosed for enabling fast synchronization of the slaved tape machines on start-up. Prior to coming to rest, the slave tape position is read until the tape is moving too slowly for recorded time codes to be read reliably. Then, bits of the time code are counted to obtain an indication of the distance travelled by the tape after the last reliable frame number is read and the tape comes to rest. In order to provide for the finite acceleration delay of the slave tape machines on startup, each slave tape is stopped a specified number of frames ahead of the master tape.

28 Claims, 10 Drawing Figures

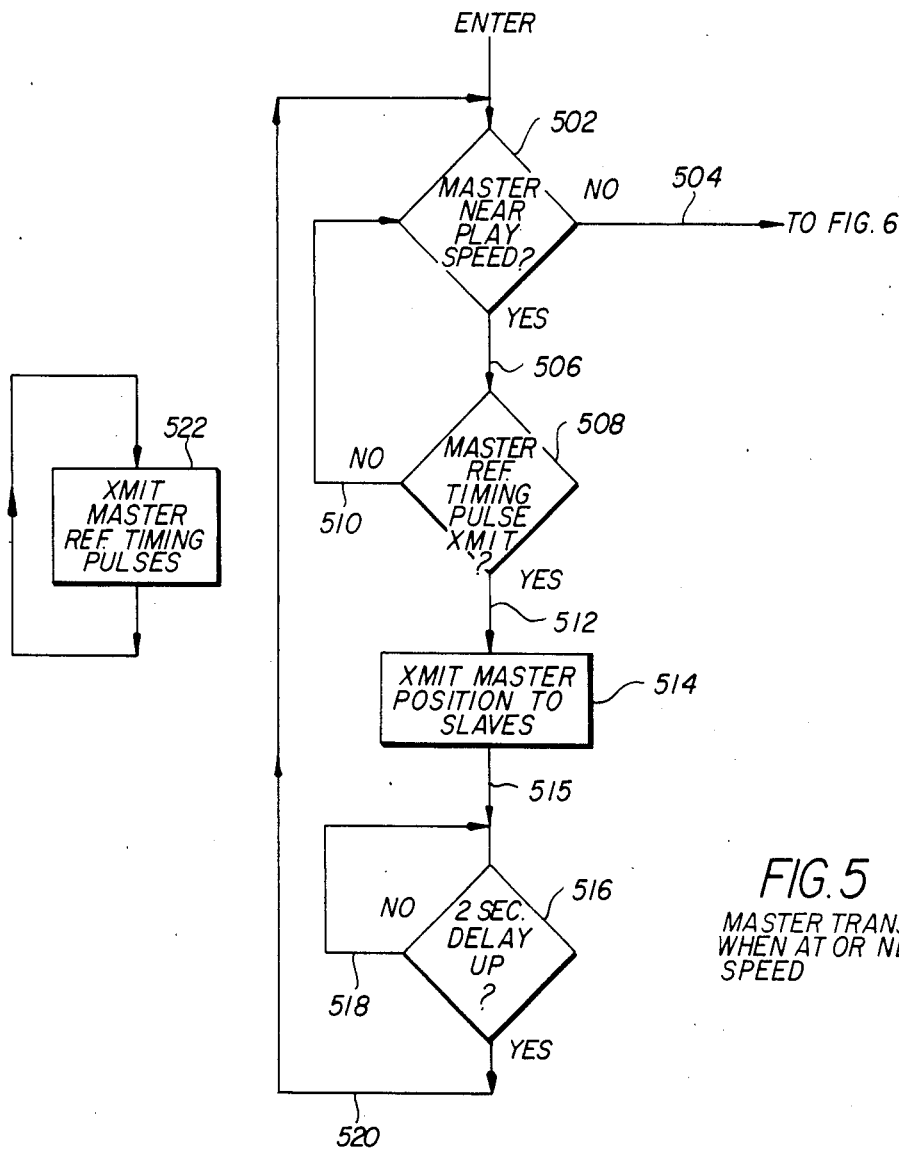

MASTER TRANSMISSION WHEN NOT AT OR NEAR PLAY SPEED

FAST SYNCHRONIZATION OF SLAVE

PARKING SLAVE AHEAD

METHOD AND APPARATUS FOR SYNCHRONIZING TAPE RECORDING AND PLAYBACK MACHINES

BACKGROUND OF THE INVENTION

The present invention relates to apparatus and methods for synchronizing a plurality of tape recording and playback machines, such as video tape recorders and audio tape recorders. The present invention may be used, for example, to synchronize a plurality of video tape recorders together, or to synchronize an audio track to a video track.

Several solutions to the problem of synchronizing a video tape with a sound track or various tracks of sound have been put forward in the past.

The earliest solution was to synchronize various tapes mechanically by use of sprockets and sprocket holes in films The advent of magnetic tape has made electronic synchronization possible. In an initial recording phase, electronic time codes are recorded on video and audio tapes, on specially designated tracks on each tape. These time codes identify the blocks of information recorded on the tapes, the blocks being known as frames. In a later playback phase, the video and audio tapes are synchronized using the recorded electronic time codes read by separate heads. There is a standard film industry time code called the SMPTE time code which uses a standard encoding method known as the Manchester Code. These coding schemes are well known to those skilled in the art. Their names are included for the convenience of the reader.

In the prior art, during playback, tape machines are coupled together via an individual synchronizing apparatus for each tape machine. Two communications channels are provided. A central controlling device transmits control signals to each tape machine for each tape and receives back a status signal from each tape machine. Furthermore, a preselected master machine transmits a frame number to each tape machine for each frame, thus requiring a separate bus coupling the tape machines together for the frame number code, in addition to a separate control bus, generally a serial bus, which is used for controlling the tape transport. The bus for transmitting the frame number code may be a parallel bus, since a relatively large amount of information must be transmitted in order to identify each frame. Due to bandwidth restrictions, the frame number code cannot be transmitted on the same serial bus as the transport control signals. The central controlling device must also determine the relative locations of the various tape machines to be synchronized and control them accordingly. In a typical commercial application, between two and forty separate tape machines may be used. The communications requirements for large numbers of machines become prohibitive in prior art electronic systems. Accordingly, the prior art systems are limited to a relatively small number of tape machines which can be synchronized unless complex bus systems are provided.

An example of a prior art tape synchronizing device is the STUDER TLS 4000 synchronizer. Other known synchronizing systems are described in U.S. Pat. Nos. 4,210,939, 3,911,488, 4,450,490, 4,214,278, 4,335,401 and 4,322,747. Other systems, which relate to time code reading and tape transport control are shown in U.S. Pat. Nos. 4,232,347, 4,360,843, 3,736,565, 2,702,315, 4,267,564, 4,316,224 and 3,274,574.

SUMMARY OF THE INVENTION

It is therefore an object of the present invention to reduce the amount of data which must be communicated to each tape machine in order to keep that tape machine synchronized.

It is a further object of the present invention to distribute synchronization processing in order to reduce the cost of controlling synchronized tape machines.

It is yet a further object of the present invention to communicate all synchronization data via a single communication channel including a serial port interconnecting a plurality of tape machines instead of via a parallel bus.

It is a further object of the present invention to provide a system for synchronizing a large number of tape machines together using a single communication channel.

It is a further object of the present invention to provide a system for synchronizing a large number of tape machines together using a single communication channel which comprises a serial port and a single master timing reference line.

It is furthermore an object of the present invention to provide a method and apparatus for synchronizing a large number of tape machines without requiring a complicated interconnecting bus and one which can synchronize, for example, at least thirty two tape machines.

It is still a further object of the present invention to increase the reliability of synchronization of a plurality of tape machines.

It is furthermore another object of the present invention to provide a method and apparatus for determining tape positions even during low speed operation or when the tape transport is being stopped.

It is furthermore another object of the present invention to provide a method and apparatus for quickly synchronizing a plurality of tape machines together on start-up.

These and other objects are achieved according to one aspect of the present invention by a method for synchronizing the recording tracks of recording tapes on a plurality of tape recording and playback machines, the recording tracks having a plurality of consecutive frames recorded thereon, each of the frames being identifiable by a frame number, comprising the steps of selecting any one of the plurality of machines as a master unit, the at least one remaining machine being a slave unit, transmitting on a communication channel from the master unit to the slave unit a first signal indicative of the position of a selected one of the frames on the tape on the master unit, transmitting on the communication channel from the master unit to the slave unit a second signal indicative of the start of each of the frames without transmitting information concerning the frame number of the frames other than the first signal, receiving the first and second signals at the slave unit, decoding the first signal to identify the position of the tape on the master unit, counting the number of pulses of the second signal at the slave unit after receipt of said first signal to generate thereby a third signal corresponding to the position of the tape on the master unit and comparing the third signal with a fourth signal recorded on a tape on the slave unit to synchronize the tape on the slave unit with the tape on the master unit.

According to another aspect of the present invention, the above objects are achieved by a method for synchronizing a second tape recording and playback machine to a first tape recording and playback machine to enable synchronized start-up of the first and second machines comprising the steps of generating a signal to stop the second machine, reading a time code signal from a tape on the second machine indicative of frame numbers of the tape being read by the second machine, the step of reading including reading the last of the frame numbers which can be read reliably during the time period when the second machine is stopping, counting bits of the time code signal after the last frame number is read to indicate the relative distance travelled by the tape on the second machine after the last frame number is read to generate thereby a first signal indicative of the position of the tape when the second machine comes to a stop, starting the first machine and transmitting a second signal to the second machine indicative of the position of a tape on the first machine, reading the second signal indicative of the position of a tape on the first machine at the second machine, and restarting the second machine at a selected point in time dependent on the first signal so that the second signal and said time code signal have a fixed relationship.

According to a further aspect of the present invention, the above objects are achieved by a method for determining the position of a tape on a tape recording and playback machine comprising the steps of generating a signal to stop the machine, reading a time code signal from a tape on the machine indicative of frame numbers of the tape being read by the machine, the step of reading including reading the last of the frame numbers which can be read reliably during the time period when the machine is stopping, and counting bits of the time code signal after the last frame number is read to indicate the relative distance travelled by the tape on the machine after the last frame number is read to generate thereby a signal indicative of the position of the tape when the machine comes to a stop.

The objects of the present invention also are achieved by apparatus operating in accordance with the inventive methods, as will be explained in greater detail below.

BRIEF DESCRIPTION OF THE DRAWINGS

The present invention will be described in the following detailed description, with reference to the drawings in which:

FIG. 5 is a flowchart showing how synchronization is accomplished via a communications channel including a serial port when the master is at or near play speed;

DETAILED DESCRIPTION

Figure 1:
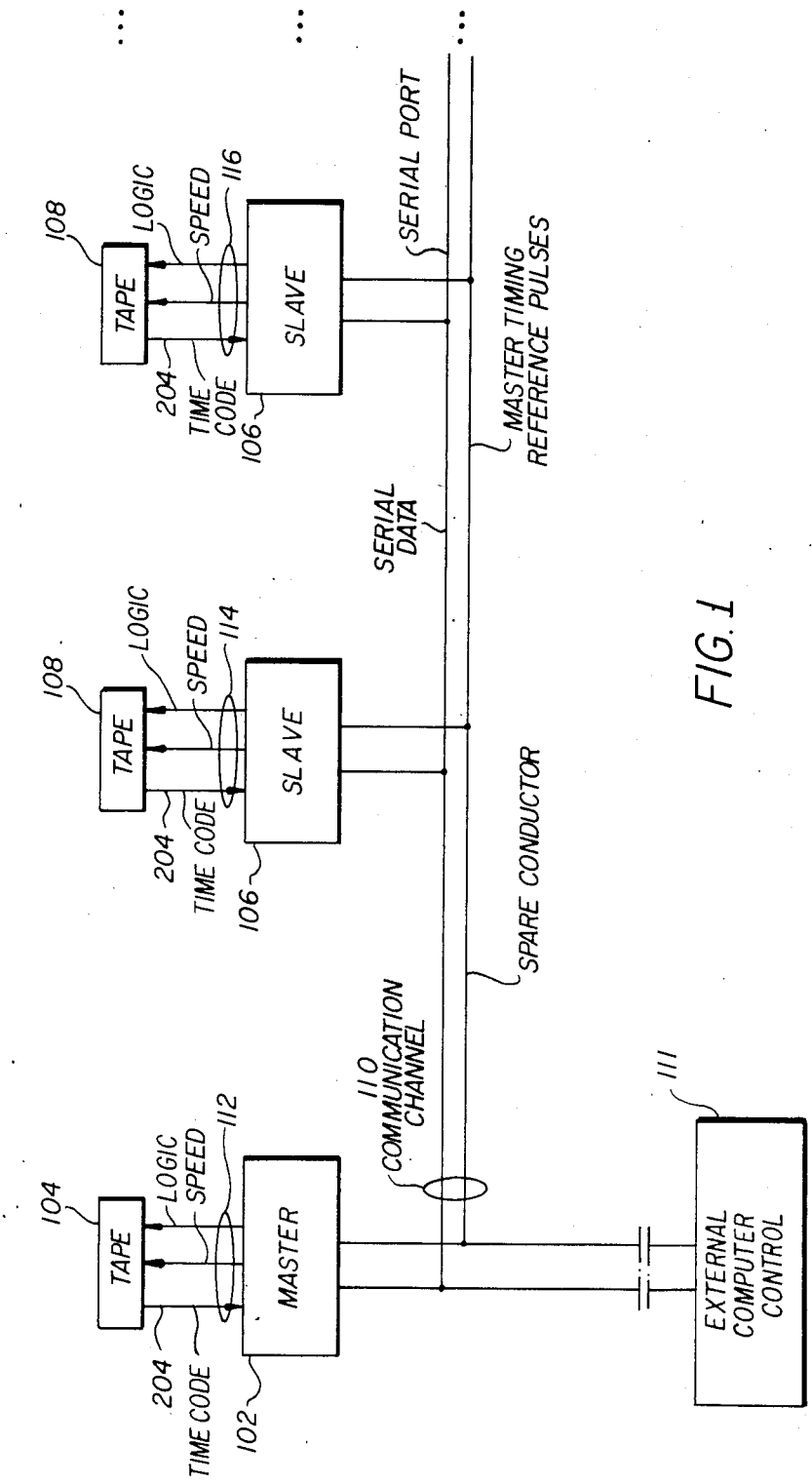
FIG. 1 is a block diagram showing several devices according to the present invention for synchronizing several tape recording and playback machines.

With reference now to the drawings, FIG. 1 shows several devices 102, 106 according to the present invention for synchronizing several standard tape recording and playback machines 104, 108. This figure also illustrates the use of a single communication channel 110 to couple the tape machines 104, 108 via synchronizing devices 102, 106 provided for each tape machine 104, 108. The communications channel 110 comprises two communication buses. One is a conventional serial port, e.g., a standard RS-422 port provided for control purposes, and the other is a single line, which may be one of the spare conductors of the conventional serial port connector, and is provided for transmitting frame reference pulses (Master timing reference pulses) for synchronizing purposes. Only three tape machines 104, 108 are shown, but more can be provided, as indicated by the dotted lines.

All of the devices 102, 106 are the same. However, the interfaces, 112, 114 and 116 may vary according to differences between the tape machines 104, 108. The cables 12, 114 and 116 carry time codes from their respective tape machines 104, 108 to their respective synchronizing devices 102, 106 and logic and tape speed control signals are communicated between the respective devices 102, 106 and their respective tape machines 104, 108 for tape transport control.

At the beginning of the synchronization process, one of the tape machines, in the illustrated example, 104, is selected to be a master. There need not be any electronic feature of the tape machine 104 or the device 102 which causes it to be chosen as the master. A user merely decides that the tape machine 104 is the appropriate master. The user then indicates that decision by positioning a switch on the device 102 to a master position, making it the master device until it is turned off or another device is chosen as the master. Thereafter the tape machines 108 are slave tape machines until all the devices are turned off and a new master is specified.

Communications channel 110 also optionally may be coupled to an external control device 111, such as an external computer, so that all the devices 102, 106 may be slaved to an external synchronizing source.

Figure 2:
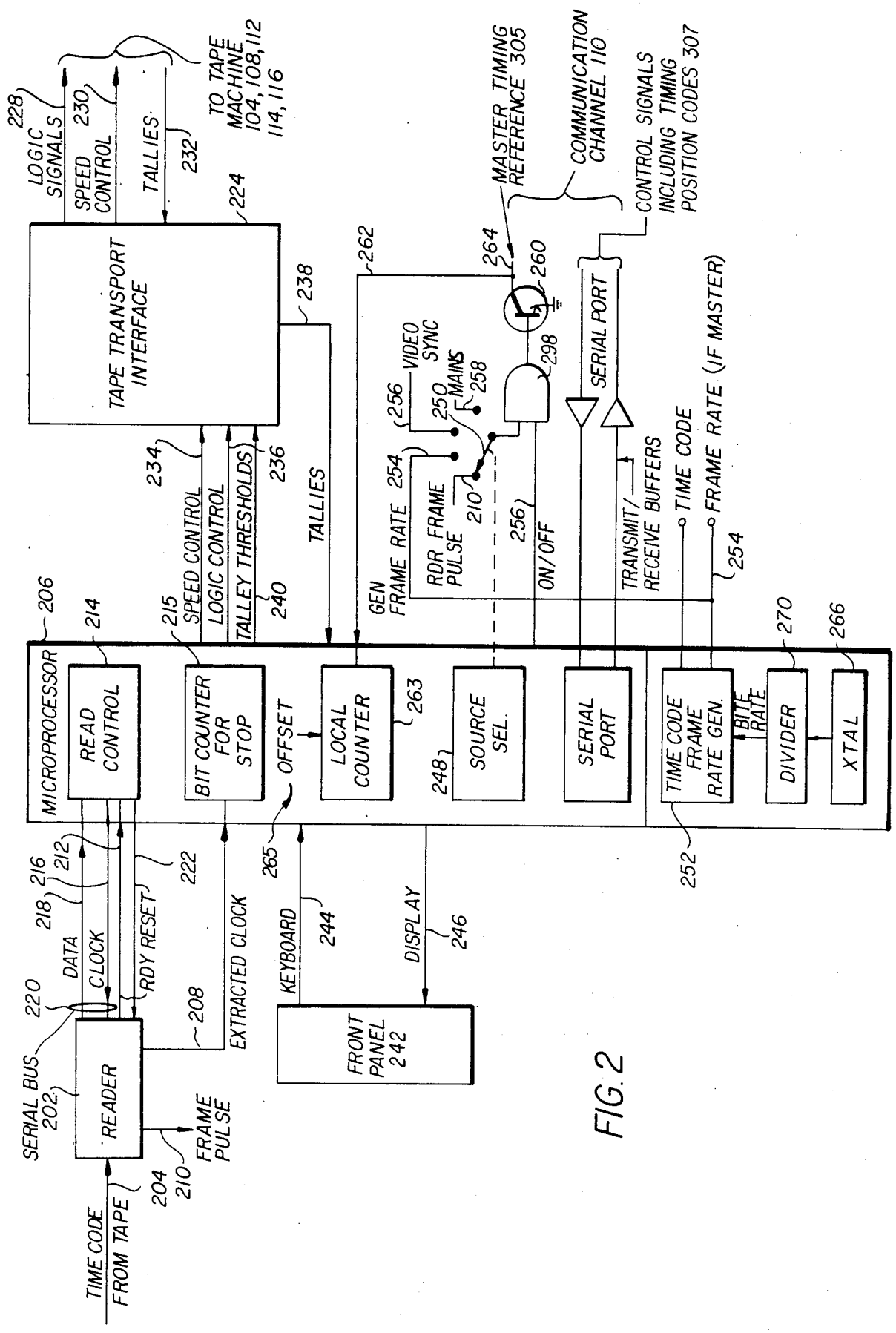
FIG. 2 is a block diagram of a preferred embodiment of a synchronizing device according to the present invention.

FIG. 2 is a block diagram of a preferred embodiment of a synchronizing device 102, 106 according to the present invention The device 102, 106 includes a reader circuit 202 which reads a time code 204 from a tape machine 104, 108 and provides it to a microprocessor module 206, which may comprise a type 8031. The reader circuit 202 can buffer at least eighty bits corresponding to the eighty bit per frame SMPTE time code. When eighty bits have been read into the reader circuit 202, the reader circuit 202 sets the ready 'rdy' flag 212. When the ready 'rdy' flag 212 is set, reader control software within a ROM 214 within the microprocessor module 206 begins to take the data in the reader circuit 202 one bit at a time. A pulse is sent along the clock line 216 to signal for the transmission of each bit. The bit travels to the microprocessor module 206 along the data line 218. The clock line 216 and the data line 218 form a serial bus 220. Their combined function is to transmit the read frame number to the microprocessor module 206.

When a frame has been processed by the microprocessor module, a signal is transmitted on the reset line 222 to signal for the next frame stored in the reader circuit 202 to be read by the microprocessor module.

The reader circuit 202 also extracts a clock pulse on line 208 and a frame pulse on line 210 for synchronizing purposes from the time code cable 204 and inputs them to the microprocessor module 206. The operation of this circuit will be explained in greater detail with reference to FIGS. 4A and 4B. There are eighty clock pulses on line 208 per frame pulse on line 210, according to the SMPTE time code. The frame pulse on line 210 signals the transition from the end of one frame on the tape machine 104, 108 and the beginning of another frame. As will be described in more detail below, the extracted clock 208 enables an accurate determination to be made of the position of a tape machine once it has stopped.

The microprocessor module 206 processes the time code data fast enough to read every frame number from a tape moving at ordinary play speeds. During fast forward and rewind, the reader circuit 202, which reads a frame number only upon receiving a signal from the reset line 222, only takes in some of the passing frame numbers. This allows for coarse synchronization until slower speeds are reached.

Each of the devices 102, 106 also has a machine logic and control interface 224 which allows it to be connected to a variety of different kinds of tape machines 104, 108 having varying logic and control formats. A switch, not shown, on device 102, 106 allows the selection of the type of tape machine by a user. Each of the configuration signals is prestored in the microprocessor 206. The signals include tally thresholds, logic polarity, and tachometer rate. The machine interface 224 then converts outputs from microprocessor module 206 into the format required for a particular tape machine.

The machine interface 224 sends to the tape machine 104, 108 logic signals 228 and speed control signal 230. The logic signals 228 may include, for example, forward, fast forward, rewind, play, and stop. The machine interface 224 receives from the tape machine 104, 108 "tallies" 232, which indicate the mechanical state of the tape machine 104, 108, such as whether the tape is moving forward or backward and how many feet of tape have passed. Tallies are particularly useful for tape machines which are unable to transmit a time code 204 to the reader circuit 202 during fast forward or rewind.

Inputs and outputs from the tape machines 104, 108 are converted to a more generalized format by the machine interface 224 for the microprocessor module 206. In particular, it converts: the generalized format speed control signal 234 from microprocessor module 206 into the specialized format speed control 230; the generalized format logic control signal 236 into the specialized format logic control signal 228; and the specialized format tallies 232 into the generalized format tallies 238. In addition, the machine interface 224 keeps track of tally thresholds 240, which are specialized voltage sensitivities, dependent on the particular tape machine chosen.

The devices 104, 108 also have a user interface or front panel 242. This panel has switches or a keyboard capable of accepting user input concerning, for example, whether the tape machine attached to this device is a master, what the source of master timing or reference frame rate is, and what type of tape machine is coupled to the device. The user input to the microprocessor 206 is shown as keyboard lines 244. The panel has displays showing, among other things, the present time code position. Display output from the microprocessor module is transmitted to a display device via lines 246.

The devices 104, 108 may synchronize tapes from various sources of frame synchronization chosen by a source selector 248, which drives a switch 250. Source selector 248 may be a program stored in ROM of microprocessor module 206. Manual control of the source of frame synchronization may also be provided, in which case switch 250 may be provided on the front panel of device 102, 106. One source of frame synchronization may be the reader frame pulse 210 derived from the time code 204 from the master tape machine 104 and generated by the reader circuit 202. Another source of frame synchronization may be a generator frame rate pulse 254 provided by an internal time code and clock generator 252 provided within the device 102, 106. A third source of frame synchronization, may be an external video sync signal 256 such as is commonly used in the video industry to synchronize video systems. A fourth source of frame synchronization may be a standard power line 258, currently used for frame synchronization by the film industry because it provides a convenient source of 50 or 60 Hz timing signals. Time code-frame rate generator 252 is provided optionally in the device 102, 106 and may be used to generate initially time codes during record operations for later playback synchronization.

The setting of the electronic switch 250 may be determined by a physical switch, not shown, on the panel 242 which is set by a user. The ON/OFF line 256 is set to ON only for a master machine 102 running at play speed. AND logic 298 thus allows the output of master timing reference pulses to communication channel 110 according to the chosen source of frame synchronization, specified by the switch 250, when the system is at play speed.

A driver transistor 260 is coupled to the output of AND logic 298. Transistor 260 allows devices according to the present invention to be used in parallel, with the master timing reference coming from a wired OR comprising the various parallel transistors 260, whose collectors are all tied together to the common master timing reference frame pulse line of communication channel 110. Thus, when several devices 102, 106 are used together, the assembly that includes the switch 250, the AND gate 298, and the transistor 260, is active only for the master device 102, not for the slave devices 106.

A line 262 feeds the master timing reference pulses to the microprocessor module 206 from the communication channel 110. Thus, each slave device 106 receives the master timing reference frame pulses via line 262. These pulses are fed to a counter stage 263, which may be software implemented. The purpose of counter 263 is to count master timing reference pulses after receipt of a frame number or position code from the master device 102. By counting master timing reference pulses, an accurate indication of the current master frame number may be obtained at each slave unit, even though frame numbers are not transmitted for each frame. The output 264 from transistor 260 is one line of communication channel 110. The remaining lines of channel 110 are used, for example, for standard RS422 serial communications. The channel 110 serial port allows, for instance, a control computer 111, shown in FIG. 1, to interrogate devices 102, 106, for their current status, such as in response to a command from an engineering remote control, not shown.

As explained, the devices 102, 106 also may have an internal frame rate generator 252 which creates a frame rate pulse 254, which, as described above, may be one source of the synchronizing master timing reference. In a preferred embodiment, a crystal oscillator 266 is provided, the output of the oscillator being coupled to frequency divider stage 270 which divides down the oscillation rate to desired frequencies. The divider 270 uses different divisors depending on, for instance, whether a European or American frame rate is required.

Figure 3:
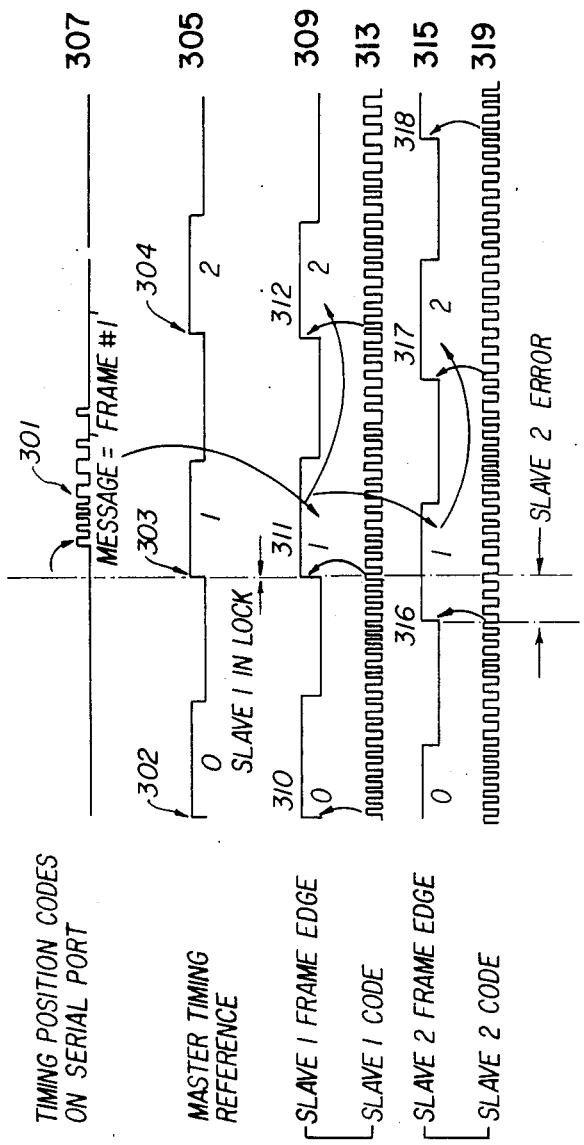
FIG. 3 is a timing diagram for signals transmitted in the apparatus shown in FIG. 1.

FIG. 3 is a timing diagram illustrating the transmission of synchronizing information between master and slave at or near play speed.

Signal 307 comprises at least one position code or frame number 301 which is transmitted via the serial RS422 port 110 from the master to the slaves. Unlike prior art synchronizing apparatus, in the present invention, the frame number 301 is transmitted relatively infrequently to the slaves, for example, at two second intervals at normal play speeds. Counter 263 keeps track of the frame number by counting the number of master timing reference pulses received on line 262. Waveform 305 shows the periodic transmission of master timing reference pulses 302, 303, 304, which are received on line 262 of the slaves. As shown, a position code 307 only is transmitted occasionally, not for every frame. Frames are counted from the position code 301 using the master timing reference pulses 302, 303, 304, i.e., once a frame number or position code 301 is received for a selected frame, another frame number is not transmitted, except infrequently for error checking or verification purposes. Instead, counter 263 locally keeps track of the frame number by counting the master timing reference pulses 305. Thus, for example, if frame number 10 is received and five reference pulses 305 are counted thereafter, the master tape position is at frame 15. This arrangement frees the serial port 110 for other uses and dispenses with the need for a separate parallel bus for frame number information.

Waveform 309 shows the slave frame pulses from a slave tape machine 108 as detected by a slave device 106 where the slave machine 108 is synchronized to the master. As shown in the figure, the slave frame pulses 310, 311, 312 are in synchronism with the master timing reference pulses 302, 303, 304. The slave frame pulses 309 are generated internally by slave devices 106 from the time code 313 read off the slaved tape and transmitted to device 106. All eighty bits per frame of the SMPTE time code 313 are not shown because of the difficulty in drawing them.

Although in FIG. 3, the slave 1 frame code 309 is shown synchronized with master frame number 1, the slave frame number need not be synchronized with the corresponding master frame having the same frame number. For example, the slave tape can be synchronized to the master tape with an offset establishing a fixed relationship between the master and slave tapes. See "offset" 265 in FIG. 2. When a new master is selected, as described above, the offset of the new master is subtracted from the offset of all the other devices.

Waveform 315 shows slave frame pulses for a hypothetical slave tape machine 108 which is temporarily out of synchronization with the master tape machine 104. The slave frame pulse 316 is detected to be out of synchronism with the master pulse 303 by suitable edge sensitive circuitry and timing devices within the slave device 106. In response to the error detection, the slave device 106 changes the speed control input 230 to the tape machine 108 and thus corrects the error in synchronization. During ordinary play mode, correction is done slowly, to prevent uneven play. The waveform 319 illustrates the eighty bit SMPTE time code for the hypothetical second slave tape machine. Again, all eighty bits per frame are not shown because of the difficulty in drawing them.

Figure 4:
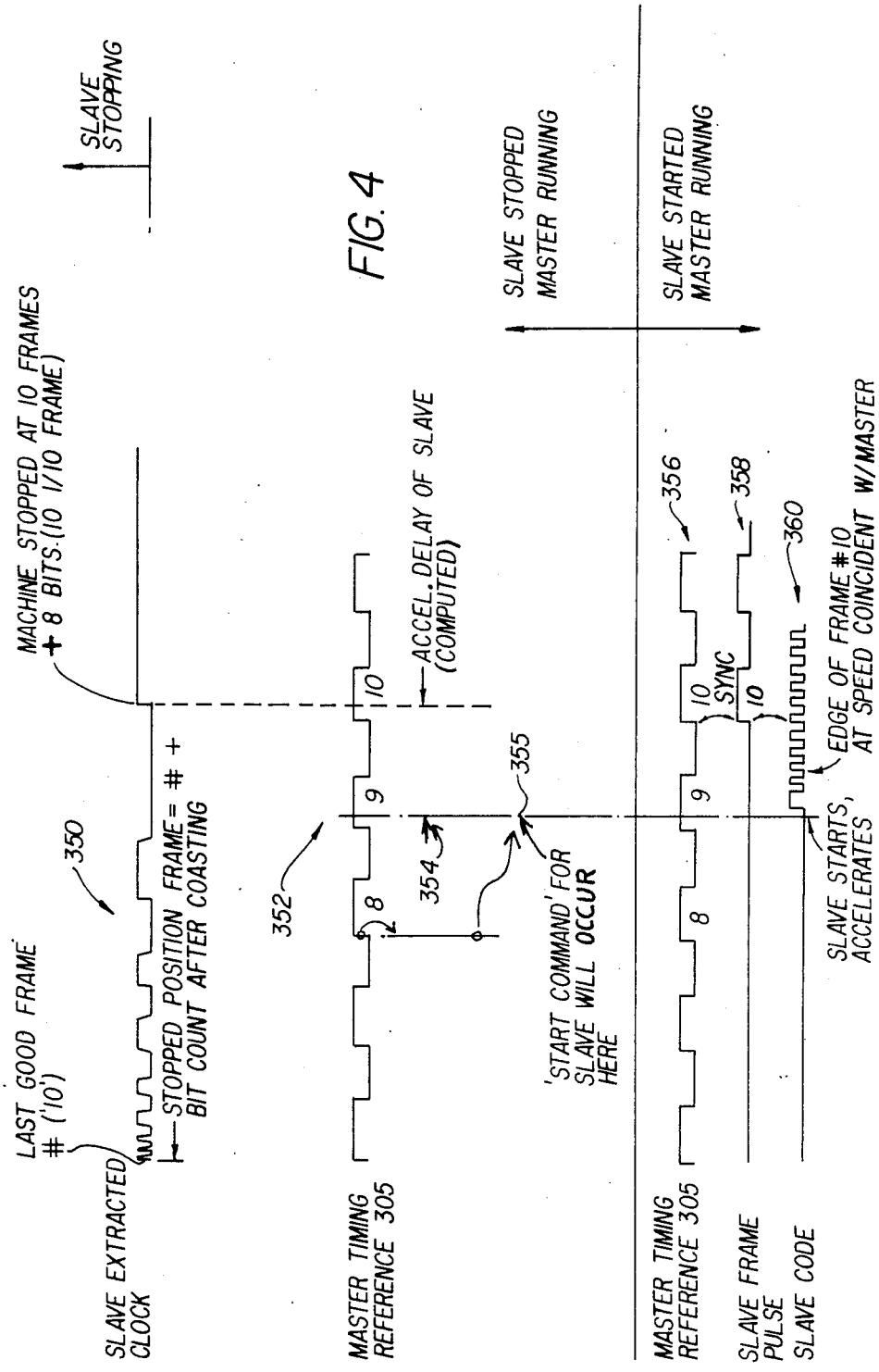
FIG. 4 is a timing diagram illustrating how tape machines are synchronized quickly when the play mode is entered.

FIG. 4 shows how rapid synchronization of a slave tape machine 108 to a master tape machine 104 may be accomplished upon start-up of the master. Prior to stopping a slave tape machine 108, the position of the slave tape must be known fairly accurately. The slave tape slows down or coasts to a stop after receiving a stop instruction via the serial port 110. During coasting, the time code from the slave tape cannot be read accurately because the tape is moving too slowly for its tape head to read the time code reliably. According to the present invention, the time code need not be read while the slave tape is coasting to a stop. Instead, the last frame number which can be read reliably is stored. From that point onward, until the tape stops, the slave device 106 counts the number of bits in the time code rather than reading the time code itself. This is shown in FIG. 4.

The reader circuit 202 into which the time code is input, extracts a signal 208 which is fed to a bit counter 215, which may be implemented by software in microprocessor module 206. When the slave tape stops, the number of bits counted is added to the last frame which was read reliably. For example, as shown in FIG. 4 at 350, the last frame number which was read reliably was frame 10. Eight bits were counted thereafter as the tape was slowing down to a stop. Since the SMPTE time code has 80 bits per frame, this represents one-tenth of a frame for the tape to slow down. Accordingly, the tape in the slave machine has stopped at approximately frame 10 and 1/10th. Therefore, before start-up, the position of the tape in the transport is known quite accurately. Further, in order to take into account the acceleration delay (the amount of time it takes for a tape machine to reach play speed from rest) of the slave tape machine 108 after the master 104 is restarted and a start command 355 is given to the slave, each slave tape machine 108 is stopped a specified number of frames ahead of the master 104, for example, 10 frames. The slave tape machine 108 could, however, be stopped only one or two frames ahead of the master 104.

Accordingly, when the master 104 is restarted, the master 104 is behind each of the slave machines 108. If, for example, as shown in FIG. 4 at 352, the slave machine 108 is stopped or "parked" two and one-tenth frames ahead of the master 104, when frame number 8 from the master 104 is sensed, the slave 108 will restart at a predetermined time, indicated by line 355, after the eighth frame is sensed, depending upon the computed, adaptive acceleration delay 354 of the slave tape machine. The acceleration delay 354 is the amount of time that it takes a slave tape machine 108 to reach its normal tape speed from rest.

Waveform 356 of FIG. 4 shows the master timing reference pulses 305 from the master tape machine 104.

Waveform 358 shows the slave frame pulses read from a slave machine 108. Waveform 360 shows the time code from a slave machine 108. As shown, once the slave machine 108 has started, the slave frame pulses are approximately synchronized with the master timing reference pulses. If there is any slight error, the error is measured and the speed control signal 230 to the tape transport is adjusted to eliminate the error.

Figure 4A:
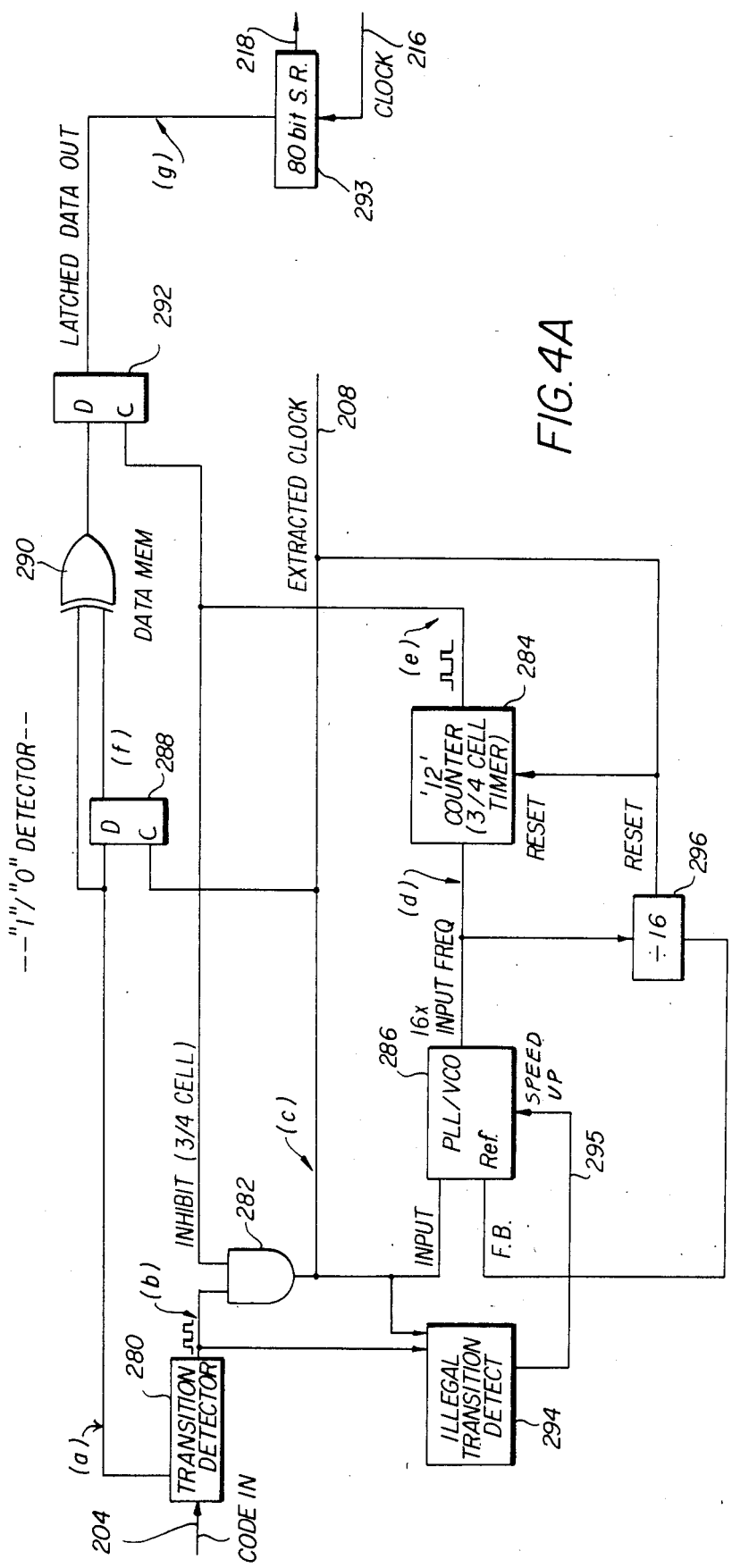
FIG. 4A is a block diagram of part of the circuit shown in FIG. 2.
Figure 4B:
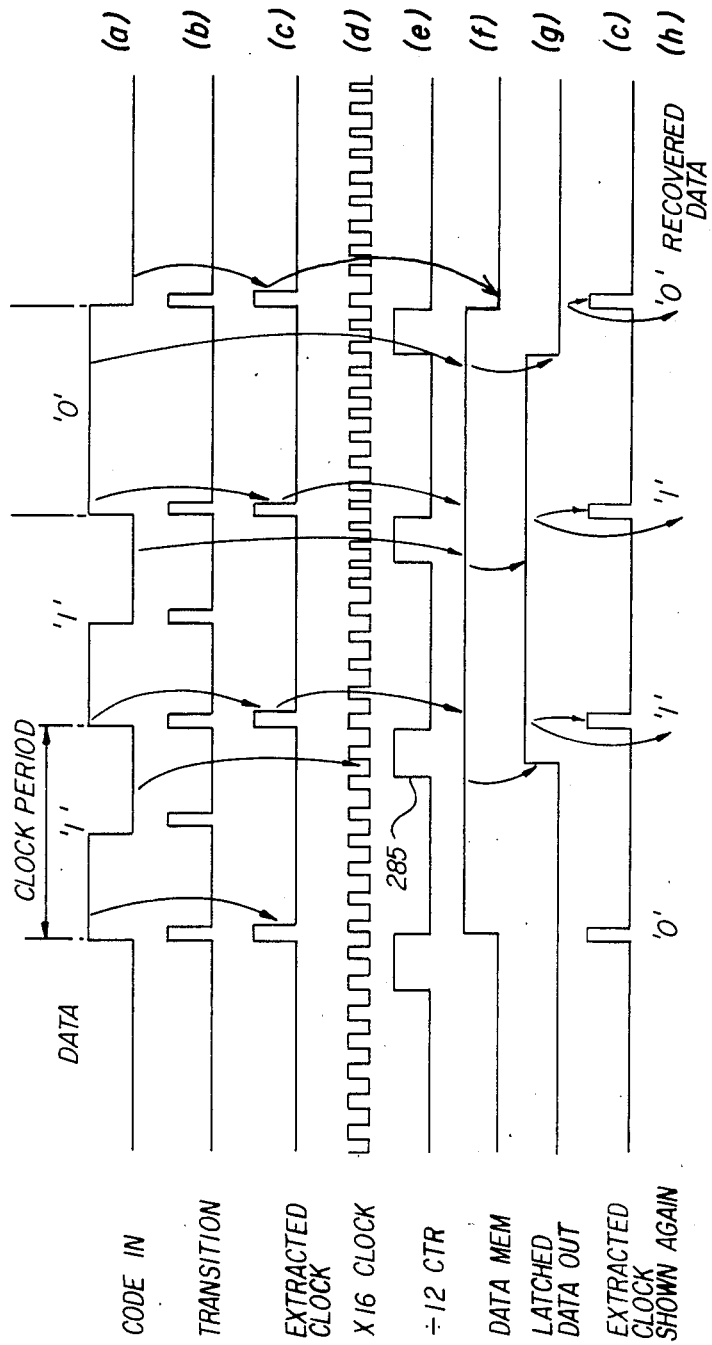
FIG. 4B is a timing diagram for signals in the block diagram of FIG. 4A.

FIG. 4A is a block diagram for the reader circuit 202 shown in FIG. 2. FIG. 4B is a timing diagram illustrating signals in the block diagram of FIG. 4A.

As shown in FIG. 4A, the reader circuit 202 comprises a transition detection circuit 280, which might comprise, e.g., a differentiator. The input to transition detection circuit 280 is the time code on line 204, shown in FIG. 4B(a). The output of circuit 280 is shown in FIG. 4B(b). The output from circuit 280 is fed to one input of AND logic 282. Another input to AND logic 282 is received from the output of a ¾ cell timer 284, to be described below.

The output of AND gate 282 is fed to a phase locked loop/voltage controlled oscillator 286, which is provided for following the frequency of the time code on line 204, and thus the speed of the tape transport. The locked output of the phase locked loop 286 is a signal which is sixteen times the input frequency from AND gate 282. This is shown in FIG. 4B(d), although FIG. 4B(d) is not drawn to the same scale. The output of phase locked loop 286 is fed to ¾ cell counter 284, which provides a pulse 285 after three-quarters of the time period between pulses of the input signal shown in FIG. 4B(c), or after three-quarters of the time code clock period. This is done because it has been found preferable to sample the time code input signal after approximately three-quarters of a clock period of the time code signal. As shown in FIG. 4B(a), a transition in the time code signal represents a "1" and no transition within a clock period represents a "0". The output of the ¾ timer 284 is shown in FIG. 4B(e). This signal is coupled back as an inhibit input to AND gate 282. The output of AND gate 282 is thus the signal shown in FIG. 4B(c), the extracted clock, which has the same frequency and period as the time code signal clock rate. Due to the phase locked loop, this signal tracks the input frequency, and thus can be used as the input on line 208 to counter 215 in FIG. 2, which counts the number of bits in the time code on line 204 when the tape machine is slowing down after the last reliable frame number is read.

Flip flop 288, which may be a type D flip flop, performs a memory function. Its output is shown in FIG. 4B(f). The output of flip-flop 288 is coupled to exclusive OR gate 290, the output of which is coupled to second flip flop 292. Exclusive OR gate 290 detects the presence of a logic "1" or "0" by determining whether the input time code has changed state by comparing it to the contents of flip-flop 288, which has stored therein the previous level of the input time code. If a change of state is detected, the output of exclusive-OR gate 290 to a logic "1". The output of exclusive-OR gate 290 is then latched into flip-flop 292 at the ¾ point by the extracted clock pulse. The output of flip-flop 292 is shown in FIG. 4B(g), and this output is coupled into an 80 bit buffering shift register 293. The output of shift register 293 is fed on line 218 to microprocessor module 206, one bit at a time as determined by clock 216. As shown in FIG. 4B(g), the latched data from flip-flop 292 is read at intervals determined by the extracted clock signal and is thus one clock period behind the input time code signal, counting from the beginning of a time code clock period.

An illegal transition detector 294 also is provided. The phase-locked loop 288 locks easily to an input signal which has a lower frequency than its internal voltage controlled oscillator (VCO). It cannot lock easily, however, to an input frequency which is higher than its VCO frequency. In the event the VCO frequency is too low, more than one transition will be detected between extracted clock pulses. This is an illegal condition, since only one transition, representing a "1", can occur between extracted clock pulses. Accordingly, detector 294 compares the extracted clock pulses to the output from transition detector 280. If more than one pulse is counted between extracted clock pulses, a signal on line 295 is temporarily fed to PLL 286 to increase the frequency of the local VCO, to allow thereby the PLL to lock to the increased frequency time code signal.

A divide by 16 counter 296 is provided, the output of which is fed back to the reference input of phase lock loop 286. The input signal to counter 296 is shown in FIG. 4B(d). Counter 296, as well as counter 284, are reset periodically, so as to restart counting, by the extracted clock pulse on line 208. Counter 296 is provided so that the output of phase locked loop 286 has a frequency 16 times the input frequency. This is accomplished because phase-locked loop 286 constantly tries to have the input from AND gate 282 match the reference frequency from counter 296.

FIG. 5 is a flowchart showing how the transmission of master tape position via the communications channel 110 is accomplished when the master tape machine 104 is at or near normal play speed. At decision block 502, the master device 102 determines whether the master tape machine 104 is operating at or near play speed. If the master 104 is not at or near play speed, the master device 102 chooses exit branch 504 to take it to the top of FIG. 6. If the master 104 is at or near play speed, the branch 506 is chosen leading to the decision block 508.

At decision block 508, the master device 102 tests to see if a master timing pulse has been transmitted down the communications channel 110. Master timing pulses 305 are continuously being transmitted as shown by the parallel loop 522. If a new master timing reference pulse has not yet been transmitted, branch 510 is chosen, returning the master device 102 to the decision block 502 to retest for a master timing reference pulse. If a master timing reference pulse has been transmitted, branch 512 is chosen, enabling a master position or frame number code 301 to be transmitted via the serial port 110 just after a master timing pulse 303, as shown at 514.

The master device 102 then passes along branch 515 to decision block 516 where the master device 102 tests for a two second delay since the last transmission of a master position code 301. If two seconds have not passed since the last transmission of a master position code 301, then the master device 102 returns along branch 518 to decision block 516. Once two seconds have passed, the master device 102 returns along branch 520 to decision block 502, thus allowing retransmission of a new master position code 301.

Accordingly, master position codes 301 are transmitted every 2 seconds, even though a larger number of master timing reference pulses were continuously transmitted during the same two second interval. This is made possible by the local counter 263 which keeps track of the master position by locally counting master pulses. A new position code 301 need only be transmitted every two seconds so as to verify the accuracy of the locally determined master position. This frees up the communications channel 110 and enables the elimination of the parallel port which was used by the prior art for transmitting frame numbers.

Figure 8:
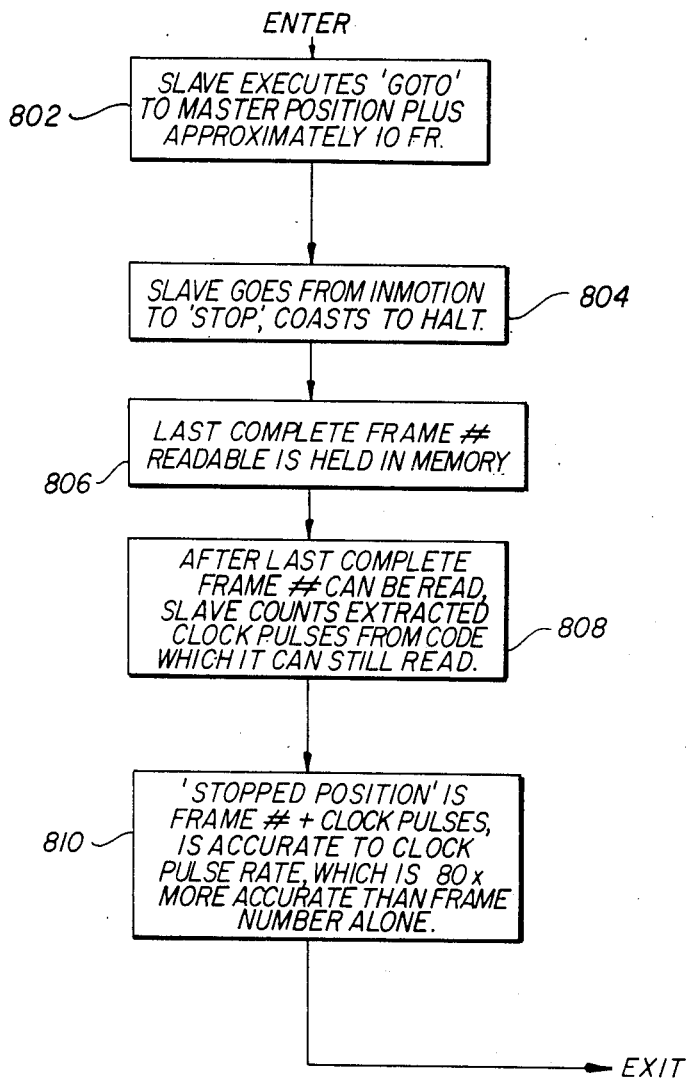
FIG. 8 is a flowchart showing how a slave machine is prepared for subsequent synchronized start-up while the slave machine is being stopped.

FIG. 8 is a flow chart showing how a slave machine 108 "parks" ahead of a master machine 104 after a stop command is generated. In an initial step, the master device 102 and tape machine 104 stop, i.e. stop sending timing codes 307 and master reference pulses 305 to the slave device 106 and the slave tape machine 108. When this happens, the slave device 106 causes the slave tape machine 108 to advance a specified number of frames, e.g., ten frames, in advance of the master machine 104, as shown in block 802. The ten frame advance is not a critical number. Some number of frames more or less than ten could also be used.

After being advanced by 10 frames, the slave device 106 directs the slave tape machine 108 to stop, causing the slave tape machine to coast to a halt as shown in block 804. As the slave tape machine coasts to a halt, the slave device 106 records the last readable frame number from the slave machine 108 and records that frame number in the memory of the slave device 106 as shown in block 806. In addition to recording the last readable frame number, the slave device 106 records the number of timing pulses extracted from the slave time code transmitted by the slave tape machine 108 prior to halt and after passing the last readable frame number, as indicated in block 808. The slave device 106 then has recorded a stop position for the slave tape machine 108 which is a combination of the position code 301 and the number of timing code pulses, as indicated in block 810. Since there are 80 clock pulses for every position code 301, this stop position is considerably more accuate than the frame number or position code 301 alone.

Figure 6:
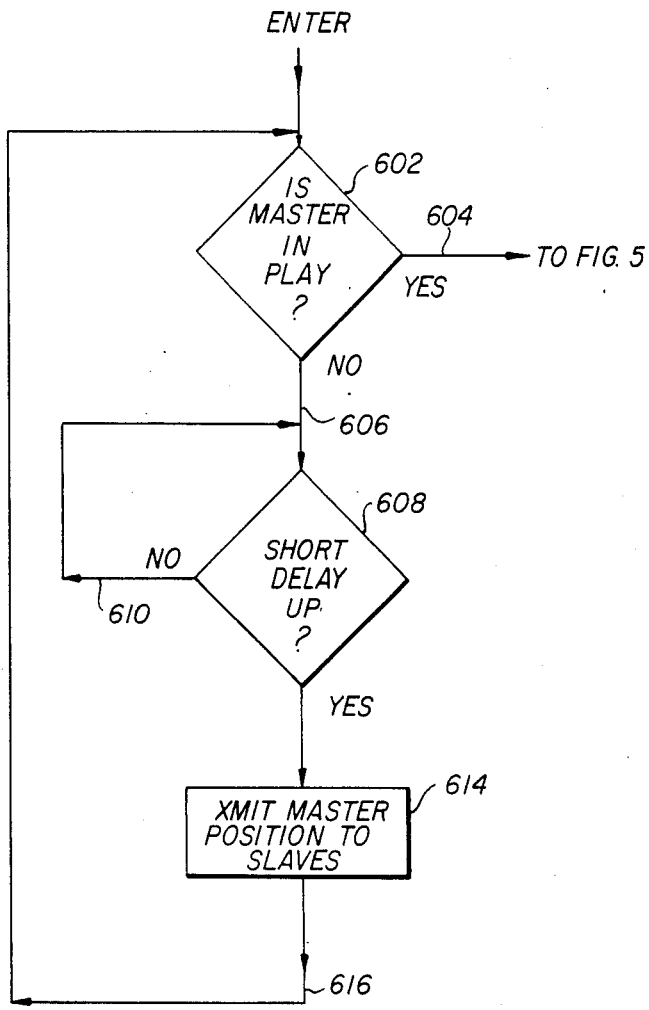
FIG. 6 is a flowchart showing how the position of the master tape is transmitted via a communiction channel including a serial port when the master is not at or near play speed.

FIG. 6 is a flowchart showing how the master tape position is transmitted via the communications channel 110 when the master tape machine 104 is not at or near its play speed, for instance, during fast forward or rewind. In the decision block 602, the master device 102 tests to see whether the master machine 104 is in play mode. If it is, the master device 102 exits along branch 604 to the top of FIG. 5. If it is not, the master device 102 proceeds along branch 606.

After taking the branch 606, the master device 102 determines whether there has been a short delay since the last transmission of a master position code 301 as indicated in decision block 608. This short delay is approximately one-tenth of a second, though other values may be chosen. The shorter delay time, as compared to the two second delay provided when the master is at or near play speed, is required, because microprocessor module 206 cannot accurately determine the master tape position when, for example, the master is in a rewind or fast forward mode. Accordingly, master position time codes 301 must be transmitted more often. This shorter delay, however, still frees the communications channel 110 considerably for control uses. If the short delay is not completed, the master device 102 loops, using branch 610, until the delay is accomplished. After the short delay, the branch 612 is taken, causing the master device 102 to retransmit the master position 301 down the serial port of the communications channel 110 as indicated in block 614. The master device 102 then loops back to decision block 602 via branch 616 to determine again whether the master tape machine 104 is in play mode or some other mode.

Figure 7:
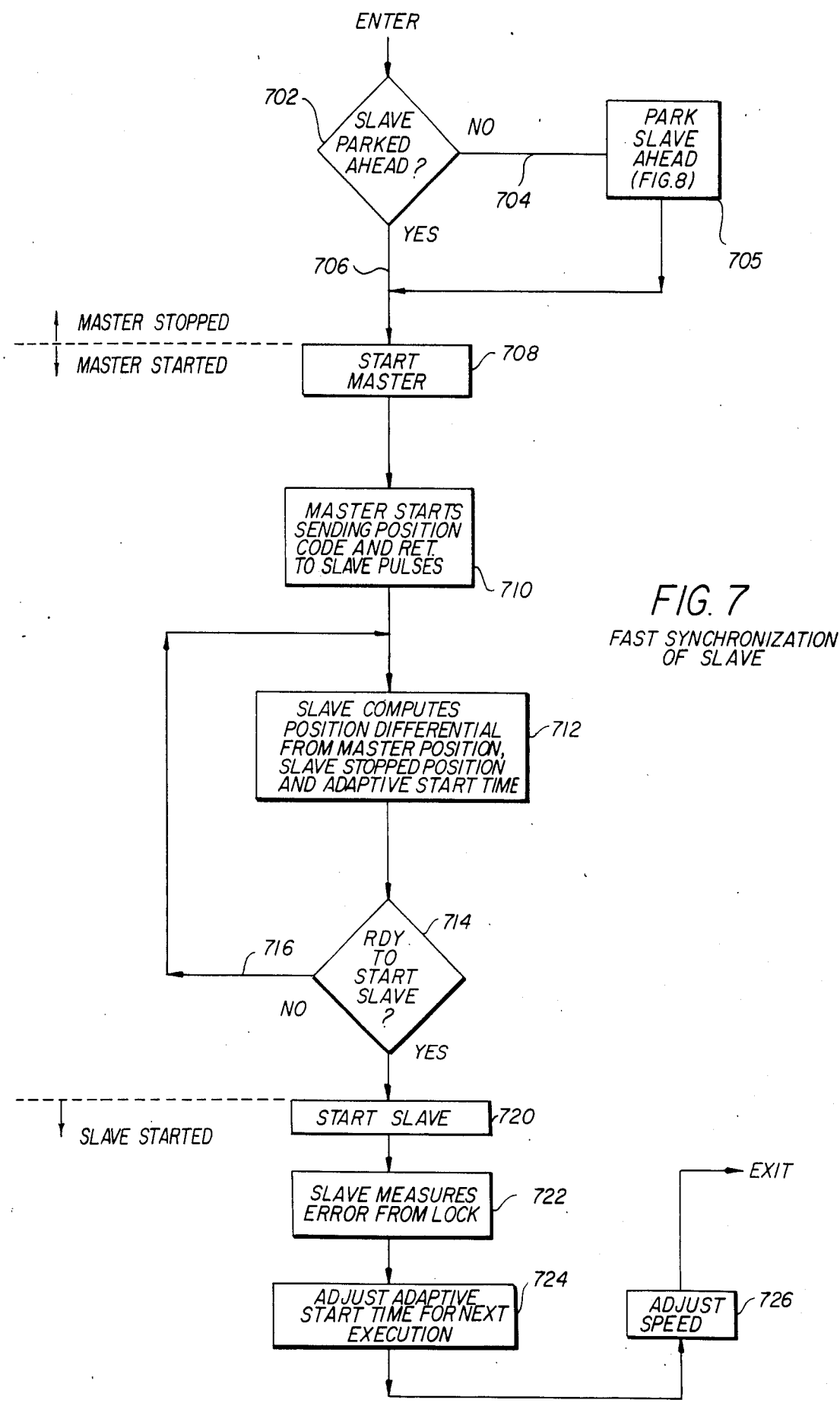
FIG. 7 is a flowchart showing how a slave machine synchronizes with the master machine during startup.

FIG. 7 is a flowchart showing how a slave device 106 synchronizes with a master device 102 during a start-up. In the decision block 702, the master tape machine 104 is stopped and the slave device determines whether the slave tape machine 108 is "parked" ahead of the master tape machine 104, that is, whether the time code appearing at the slave tape position is ahead of the time code appearing at the master tape position, as shown at 705. If the slave tape machine 108 is not parked ahead, the slave device 106 follows branch 704 to park the slave tape machine 108 ahead. If the slave tape machine 108 already is parked ahead, the master device 104 follows branch 706 to start the master tape machine 104.

After the master tape machine 104 starts, as shown at 708, it sends master timing reference pulses 305 and position codes 301 via the communications channel 110 to the slave device 106 as specified in block 710.

In block 712, as the slave device 106 receives the signals from the master device 102, the slave device 106 computes the position differential of the slave tape machine 108 from the master tape machine 104 using the position of the master tape machine 108, the position of the slave tape machine when last stopped, and a calculated adaptive start time which takes into account the acceleration delay 354 of the slave machine, as discussed with reference to FIG. 4. The slave device 106 then tests the position differential calculated in block 712 to determine whether to start the slave tape machine 108, as shown by decision block 714. If the slave tape machine 108 should not yet be started, then the slave device 106 follows the branch 716 to return to the block 712. If the slave tape machine 108 should be started, then the slave device 106 follows the branch 718 to start the slave tape machine 108 as shown by block 720.

After starting the slave tape machine 108, the slave device 106 continues to read the position codes 301 and master reference timing signals 305 from the master device 102 to measure the error from perfect lock, as shown at block 722. Perfect lock means that the slave tape machine 108 is substantially completely synchronized with the master tape machine 104.

The slave device 106 then adjusts its adaptive start time, as shown at 724 in response to the error measured at block 722. For example, if an error is measured, an incorrect acceleration delay was calculated. The amount of the error then can be used to readjust the start time, i.e., the start time is adaptive. This allows the slave device 106 to synchronize more accurately after several stops and starts. The next step, which can be performed before or after step 724, is the adjustment of the speed control signal 230 to eliminate error from perfect lock, as shown at 726.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A method for synchronizing the recording tracks of recording tapes on of a plurality of tape recording and playback machines, the recording tracks having a plurality of consecutive frames recorded thereon, each of said frames being identifiable by a frame number, comprising the steps of:

selecting any one of said plurality of machines as a master unit, the at least one remaining machine being a slave unit;

transmitting on a communications channel from said master unit to said slave unit a first signal indicative of the position of a selected one of said frames on a tape on said master unit;

transmitting on said communications channel from said master unit to said slave unit a second signal indicative of the start of each of said frames, without transmitting information concerning the frame number of said frames other than said first signal;

receiving said first and second signals at the slave unit;

decoding said first signal to identify the position of the tape on said master unit;

counting the number of pulses of said second signal at said slave unit after receipt of said first signal to generate thereby a third signal corresponding to the position of the tape on said master unit; and comparing said third signal with a fourth signal recorded on a tape on said slave unit to synchronize the tape on the slave unit with the tape on said master unit.

2. The method recited in claim 1, further comprising the step of transmitting a second one of said first signals indicative of a subsequent one of said frames on said tape on said master unit a preset time after the first one of said first signals has been transmitted from said master unit to said slave unit, said second one of said first signals being provided in order to verify the accuracy of said third signal.

3. A method for synchronizing a second tape recording and playback machine to a first tape recording and playback machine to enable synchronized start-up of said first and second machines comprising the steps of:

generating a signal to stop said second machine;

reading a time code signal from a tape on said second machine indicative of the frame numbers of the tape being read by said second machine, said step of reading including reading the last of said frame numbers which can be read realiably during the time period when said second machine is stopping;

counting bits of said time code signal after said last frame number is read to indicate the relative distance travelled by the tape on said second machine after said last frame number is read to generate thereby a first signal indicative of the position of the tape when said second machine comes to a stop;

starting said first machine and transmitting a second signal to the second machine indicative of the position of a tape on said first machine;

reading said second signal indicative of the position of a tape on said first machine at said second machine; and restarting said second machine at a selected point in time dependent on said first signal so that said second signal and said time code signal have a fixed relationship.

4. The method recited in claim 3, wherein said step of transmitting a second signal comprises the steps of:

transmitting from said first machine to said second machine a third signal indicative of the position of a selected one of the frames on the tape of said first machine;

transmitting from said first machine to said second machine a fourth signal indicative of the start of each of said frames, without transmitting information concerning the frame number of said frames other than said third signal; and further comprising the steps of:

receiving said third and fourth signals at the second machine;

decoding said third signal to identify the position of the tape on said first machine;

counting the number of pulses of said fourth signal after receipt of said third signal at said second machine to generate thereby a fifth signal corresponding to the position of the tape on said first machine; and comparing said fifth signal with said time code signal to synchronize the tape on said second machine with the tape on said first machine.

5. The method recited in claim 4, wherein said third signal is transmitted on a serial port between said first and second machines and said fourth signal is transmitted on a spare conductor of said serial port.

6. The method recited in claim 3, further comprising the step of advancing said second machine a predetermined number of frames ahead of the tape on said first machine prior to stopping said second machine.

7. A method for determining the position of a tape on a tape recording and playback machine comprising the steps of:

generating a signal to stop said machine;

reading a time code signal from a tape on said machine indicative of frame numbers of the tape being read by said machine, said step of reading including reading the last of said frame numbers which can be read reliably during the time period when said machine is stopping; and counting bits of said time code signal after said last frame number is read to indicate the relative distance travelled by the tape on said machine after said last frame number is read to generate thereby a signal indicative of the position of the tape when said machine comes to a stop.

8. Apparatus for synchronizing the recording tracks of recording tapes on a plurality of tape recording and playback machines, the recording tracks having a plurality of consecutive frames recorded thereon, each of said frames being identifiable by a frame number, comprising:

means for selecting any one of said plurality of machines as a master unit, the at least one remaining machine being a slave unit;

means for transmitting on a communications channel from said master unit to said slave unit a first signal indicative of the position of a selected one of said frames on a tape on said master unit;

means for transmitting on said communications channel from said master unit to said slave unit a second signal indicative of the start of each of said frames, without transmitting information concerning the frame number of said frames other than said first signal;

means for receiving said first and second signals at the slave unit comprising means for decoding said first signal to identify the position of the tape on said master unit and means for counting the number of pulses of said second signal at the slave unit after receipt of said first signal to generate thereby a third signal corresponding to the position of the tape on said master unit; and means for comparing said third signal with a fourth signal recorded on a tape on said slave unit to synchronize the tape on the slave unit with the tape on said master unit.

9. The apparatus recited in claim 8, further comprising means for transmitting a second one of said first signals indicative of a subsequent one of said frames on said tape on said master unit a preset time after the first one of said first signals has been transmitted from said master unit to the slave unit, said second one of said first signals being provided in order to verify the accuracy of said third signal.

10. Apparatus for synchronizing a second tape recording and playback machine to a first tape recording and playback machine to enable synchronized start-up of said first and second machines comprising:

means for generating a signal to stop said second machine;

means for reading a time code signal from a tape on said second machine indicative of the frame numbers of the tape being read by said second machine, said means for reading including means for reading the last of said frame numbers which can be read reliably during the time period when said second machine is stopping;

means for counting bits of said time code signal after said last frame number is read to indicate the relative distance travelled by the tape on said second machine after said last frame number is read to generate thereby a first signal indicative of the position of the tape when said second machine comes to a stop;

means for starting said first machine and transmitting a second signal to the second machine indicative of the position of a tape on said first machine;

means for reading said second signal indicative of the position of a tape on said first machine at said second machine; and means for restarting said second machine at a selected point in time dependent on said first signal so that said second signal and said time code signal have a fixed relationship.

11. The apparatus recited in claim 10, wherein said means for transmitting a second signal comprises:

means for transmitting from said first machine to said second machine a third signal indicative of the position of a selected one of the frames on the tape of said first machine;

means for transmitting from said first machine to said second machine a fourth signal indicative of the start of each of said frames, without transmitting information concerning the frame number of said frames other than said third signal; and further comprising:

means for receiving said third and fourth signals at the second machine comprising means for decoding said third signal to identify the position of the tape on said first machine and means for counting the number of pulses of said fourth signal at said second machine after receipt of said third signal to generate thereby a fifth signal corresponding to the position of the tape on said first machine; and means for comparing said fifth signal with said time code signal to synchronize the tape on said second machine with the tape on said first machine.

12. The apparatus recited in claim 11, wherein said third signal is transmitted on a serial port between said first and second machines and said fourth signal is transmitted on a spare conductor of said serial port.

13. The apparatus recited in claim 10, further comprising means for advancing said second machine a predetermined number of frames ahead of the tape on said first machine prior to stopping said second machine.

14. The apparatus recited in claim 10 wherein said means for reading comprises means for locking to the frequency of said time code signal.

15. The apparatus recited in claim 14 wherein said means for locking comprises phase-locked loop means.

16. The apparatus recited in claim 14 wherein said time code signal has a varying clock period, and said means for reading comprises means for detecting the logic state of said time code signal at a point in time approximately three-quarters after the start of each clock period.

17. The apparatus recited in claim 14, wherein said time code signal comprises a signal wherein the logic state of the time code signal is determined by the presence or absence of transitions in the signal, and wherein said means for reading comprises means for detecting an improper number of transitions in a clock period of said time code signal.

18. Apparatus for determining the position of a tape on a tape recording and playback machine comprising:

means for generating a signal to stop said machine;

means for reading a time code signal from a tape on said machine indicative of the frame numbers of the tape being read by said machine, said means for reading including means for reading the last of said frame numbers which can be read reliably during the time period when said machine is stopping; and means for counting bits of said time code signal after said last frame number is read to indicate the relative distance travelled by the tape on said machine after said last frame number is read to generate thereby a first signal indicative of the position of the tape when said machine comes to a stop.

19. The apparatus recited in claim 18 wherein said means for reading comprises means for locking to the frequency of said time code signal.

20. The apparatus recited in claim 19 wherein said means for locking comprises phase-locked loop means.

21. The apparatus recited in claim 19 wherein said time code signal has a varying clock period, and said means for reading comprises means for detecting the logic state of said time code signal at a point in time approximately three-quarters after the start of each clock period.

22. The apparatus recited in claim 19, wherein said time code signal comprises a signal wherein the logic state of the time code signal is determined by the presence or absence of transitions in the signal, and wherein said means for reading comprises means for detecting an improper number of transitions in a clock period of said time code signal.

23. A method for synchronizing a second tape recording and playback machine to a first tape recording and playback machine, said first and second machines having a first and second recording tape, respectively, and said first and second tapes each having a plurality of consecutive frames recorded thereon, each of said frames being identifiable by a frame number, to enable synchronized start-up of said first and second machines comprising:

storing a stop position of said second tape locally at said second machine;

starting said first machine;

transmitting on a communications channel from said first machine to said second machine a first signal indicative of a position of a first frame of said first tape;

transmitting on said communications channel from said first machine to said second machine a second signal of at least one pulse indicative of a start of at least one frame following said first frame, without transmitting information concerning a frame number of said at least one frame following;

receiving said first and second signals at said second machine;

decoding said first signal to identify a position of said first tape;

counting a number of said at least one pulse of said second signal at said second machine to generate a third signal corresponding to a position of said first tape after said first frame;

comparing one of said second signal and said third signal with said stop position locally at said second machine to generate a relative position of said first and second machines; and starting said second machine according to said relative position so as to synchronize said second machine with said first machine whereby a decision to start said second machine may be made locally at said second machine.

24. Apparatus for synchronizing a second tape recording and playback machine to a first tape recording and play back machine, said first and second machines having a first and second recording tape, respectively, and said first and second tapes each having a plurality of consecutive frames recorded thereon, each of said frames being identifiable by a frame number, to enable synchronized start-up of said first and second machines comprising:

means for storing a stop position of a second tape locally at said second machine;

means for starting said first machine;

means for transmitting on a communications channel from said first machine to said second machine a first signal indicative of a first frame of said first tape;

means for transmitting on said communications channel from said first machine to said second machine a second signal of at least one pulse indicative of a start of at least one frame, without transmitting information concerning a frame number of said at least one frame following;

means for receiving said first and second signals at said second machine;

means for decoding said first signal to identify a position of said first tape;

means for counting a number of said at least one pulse of said second signal at said second machine to generate a third signal corresponding to a position of said first tape after said first frame;

means for comparing one of said second signal and said third signal with said stop position locally at said second machine to generate a relative position of said first and second machines;

means for starting said second machine according to said relative position so as to synchronize said second machine with said first machine whereby a decision to start said second machine may be made locally at said second machine.

25. A Method for synchronizing the recording tracks of recording tapes on a plurality of tape recording and playback machines, the recording tracks having a plurality of consecutive frames being identifiable by a frame number, comprising the steps of:

selecting any one of said plurality of machines as a master unit, the at least one remaining machine being a slave unit;

transmitting on a communications channel to said slave unit a master position signal indicative of a position of a selected one of said frames on a tape on said master unit;

receiving said master position signal at the slave unit;

comparing locally at said slave unit said master position signal with a slave position signal recorded on a tape on said slave unit to produce a relative position of said slave unit and said master unit; and synchronizing the tape on said slave unit with the tape on said master unit locally at said slave unit without the slave machine sending a status signal to said master machine.

26. Apparatus for synchronizing the recording tracks of recording tapes on a plurality of tape recording and playback machines, the recording tracks having a plurality of consecutive frames being identifiable by a frame number, comprising;

means for selecting any one of said plurality of machines as a master unit, the at least one remaining machine being a slave unit;

means for transmitting on a communications channel to said slave unit a master position signal indicative of a position of a selected one of said frames on a tape on said master unit;

means for receiving said master position signal at the slave unit;

means for comparing locally at said slave unit said master position signal with a slave position signal recorded on a tape on said slave unit to produce a relative position of said slave unit and said master unit; and synchronizing the tape on said slave unit with the tape on said master unit locally at said slave unit without the slave machine sending a status signal to said master machine.

27. A method for synchronizing a second tape recording and playback machine to a first tape recording and playback machine, said first and second machines having first and second recording tapes, respectively, said first and second tapes each having a plurality of consecutive frames recorded thereon, each of said frames being identifiable by a frame number to enable synchronized start up of said first and second machines comprising the steps of:

storing a stop position of said second tape locally at said second machine;

starting said first machine;

transmitting to said second machine a first position signal indicative of a position of a selected one of said frames on a tape on said first machine;

receiving said first position signal at said second machine;

comparing locally at said second machine said first position signal with said stop position to produce a relative position of said second machine and said first machine; and starting said second machine according to said relative position so as to synchronize said second machine with said first machine whereby a decision to start said second machine may be made locally at said second machine.

28. Apparatus for synchronizing a second tape recording and playback machine to a first tape recording and playback machine, said first and second machines having first and second recording tapes, respectively, said first and second tapes each having a plurality of consecutive frames recorded thereon, each of said frames being identifiable by a frame number to enable synchronized start up of said first and second machines comprising:

means for storing a stop position of said second tape locally at said second machine;

means for starting said first machine;

means for transmitting to said second machine a first position signal indicative of a position of a selected one of said frames on a tape on said first machine;

means for receiving said first position signal at said second machine;

means for comparing locally at said second machine said first position signal with said stop position to produce a relative position of said second machine and said first machine; and means for starting said second machine according to said relative position so as to synchronize said second machine with said first machine whereby a decision to start said second machine may be made locally at said second machine.

* * * * *

UNITED STATES PATENT AND TRADEMARK OFFICE
CERTIFICATE OF CORRECTION

PATENT NO. : 4,675,757

DATED : June 23, 1987

INVENTOR(S) : Gerald Block

It is certified that error appears in the above—identified patent and that said Letters Patent is hereby corrected as shown below:

Column 3, Line 6, after "machines" insert --,--.

Column 4, Line 33, change "12" to --112--.

Signed and Sealed this

Twenty-fourth Day of May, 1988

Attest:

DONALD J. QUIGG

*Attesting Officer*  *Commissioner of Patents and Trademarks*